United States Patent [19]

Hennesen

[11] Patent Number: 4,528,868
[45] Date of Patent: Jul. 16, 1985

[54] BARRIER GUARD FOR SHEARS, PRESSES AND THE LIKE

[75] Inventor: Robert L. Hennesen, Buffalo, N.Y.

[73] Assignee: Niagara Machine & Tool Works, Buffalo, N.Y.

[21] Appl. No.: 391,579

[22] Filed: Jun. 24, 1982

[51] Int. Cl.$^3$ .............................................. F16P 1/00
[52] U.S. Cl. .................................... 74/612; 74/616; 192/134
[58] Field of Search ................. 74/612, 613, 615, 616, 74/103; 192/134

[56] References Cited

U.S. PATENT DOCUMENTS 1,105,106  7/1914  Shinski .............................. 74/616 X
1,178,168  4/1916  MacDonald et al. ................. 74/613

FOREIGN PATENT DOCUMENTS 323950   1/1930   United Kingdom .................. 74/613
683413  11/1952   United Kingdom .................. 74/615
787985  12/1957   United Kingdom ................. 192/134

Primary Examiner—Kenneth J. Dorner
Attorney, Agent, or Firm—Joseph P. Gastel

[57] ABSTRACT

A barrier guard for a machine having a machine surface including spaced brackets mounted on the machine, spaced elongated links pivotally mounted on the spaced brackets, a grille mounted for sliding movement in first slots in the elongated links, second slots in the brackets, followers attached to the grille and located in the second slots to cause the grille to move rectilinearly in the first slots when the elongated links are caused to pivot, and a base bar on the grille for providing progressively greater clearances from the machine surface when the base bar moves in a predetermined direction.

15 Claims, 8 Drawing Figures

U.S. Patent Jul. 16, 1985 Sheet 2 of 3 4,528,868
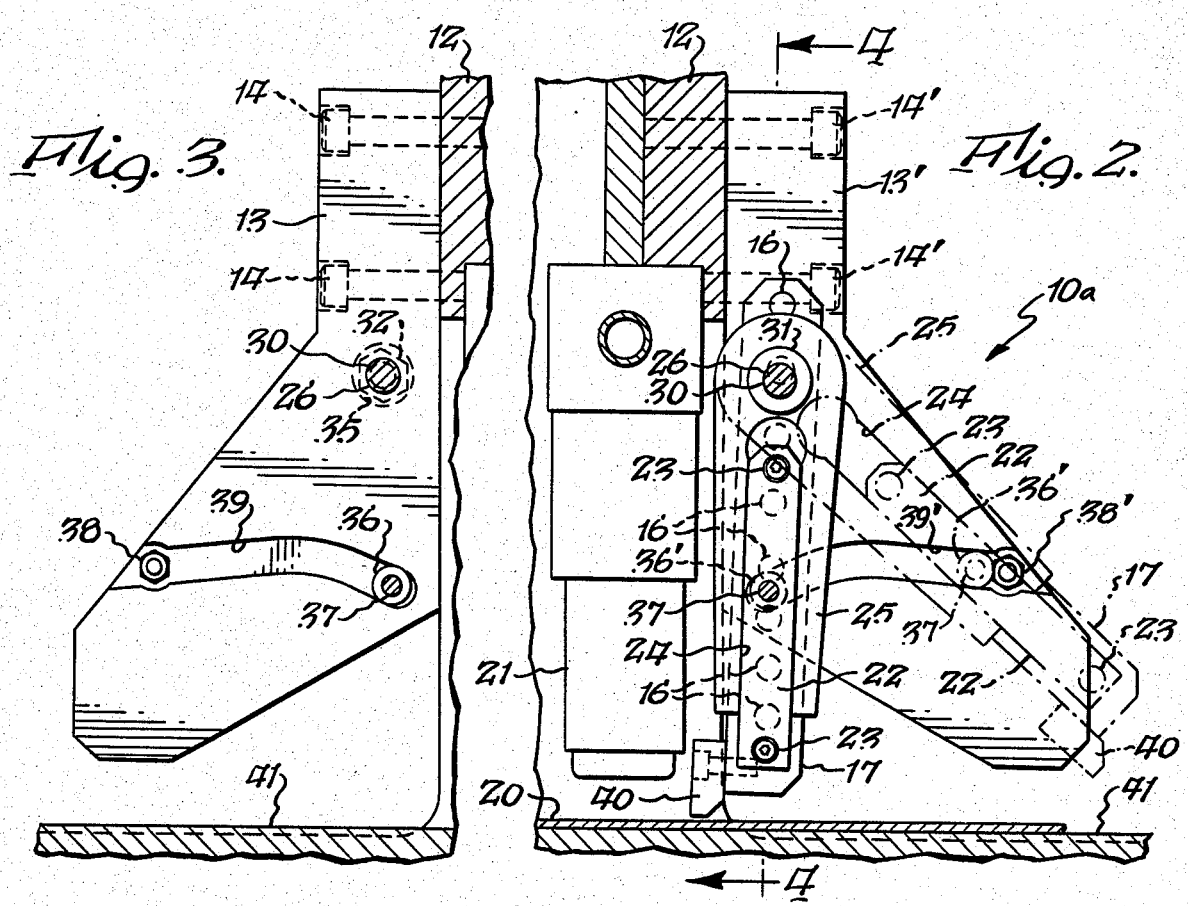
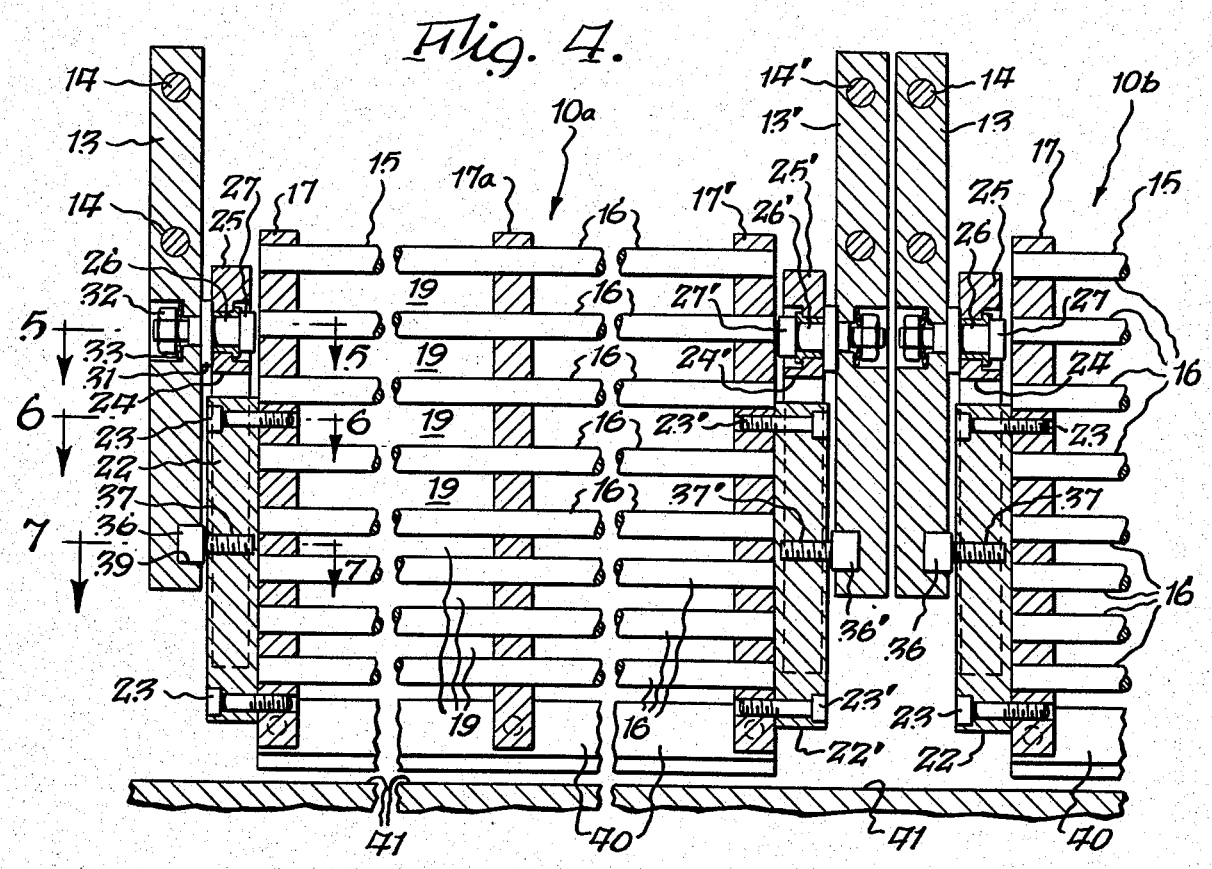

BARRIER GUARD FOR SHEARS, PRESSES AND THE LIKE

BACKGROUND OF THE INVENTION

The present invention relates to an improved barrier guard for shears, punch presses and the like.

By way of background, the lowermost portion of a barrier guard should be no further than certain distances from the bed of a machine at certain locations. In the past, swinging guards were mounted to swing in a circular arc and provided greater spacings from the bed of the machine than desired. Another type of guard possessed a linkage which was more complex than the present linkage. It is with an improvement over prior swinging guards that the present invention is concerned.

SUMMARY OF THE INVENTION

It is accordingly the object of the present invention to provide a simplified barrier guard linkage which causes the lowermost portion of a barrier guard to always be spaced from the bed of the machine approximately the precise desired amount. Other objects and attendant advantages of the present invention will readily be perceived hereafter.

The present invention relates to a barrier guard for a machine having a machine surface comprising bracket means for mounting on said machine, elongated link means pivotally mounted on said bracket means, barrier means, and slidable connection means mounting said barrier means on said elongated link means whereby said barrier means may be moved to predetermined positions resulting from pivotal movement of said elongated link means and slidable movement of said barrier means to provide progressively greater distances between said barrier means and said machine surface as said barrier means moves in a predetermined direction.

The present invention will be more fully understood when the following portions of the specification are read in conjunction with the accompanying drawings wherein:

BRIEF DESCRIPTION OF THE DRAWINGS

FIG. 2 is a fragmentary cross sectional view taken substantially along line 2—2 of FIG. 1 and showing the barrier guard in its extreme positions;

FIG. 3 is a fragmentary cross sectional view taken substantially along line 3—3 of FIG. 1 and showing the bracket with the slot therein;

FIG. 4 is a fragmentary cross sectional view taken substantially along line 4—4 of FIG. 2 and showing details of the mounting linkage for the barrier guard;

DESCRIPTION OF THE PREFERRED EMBODIMENTS

Figure 1:
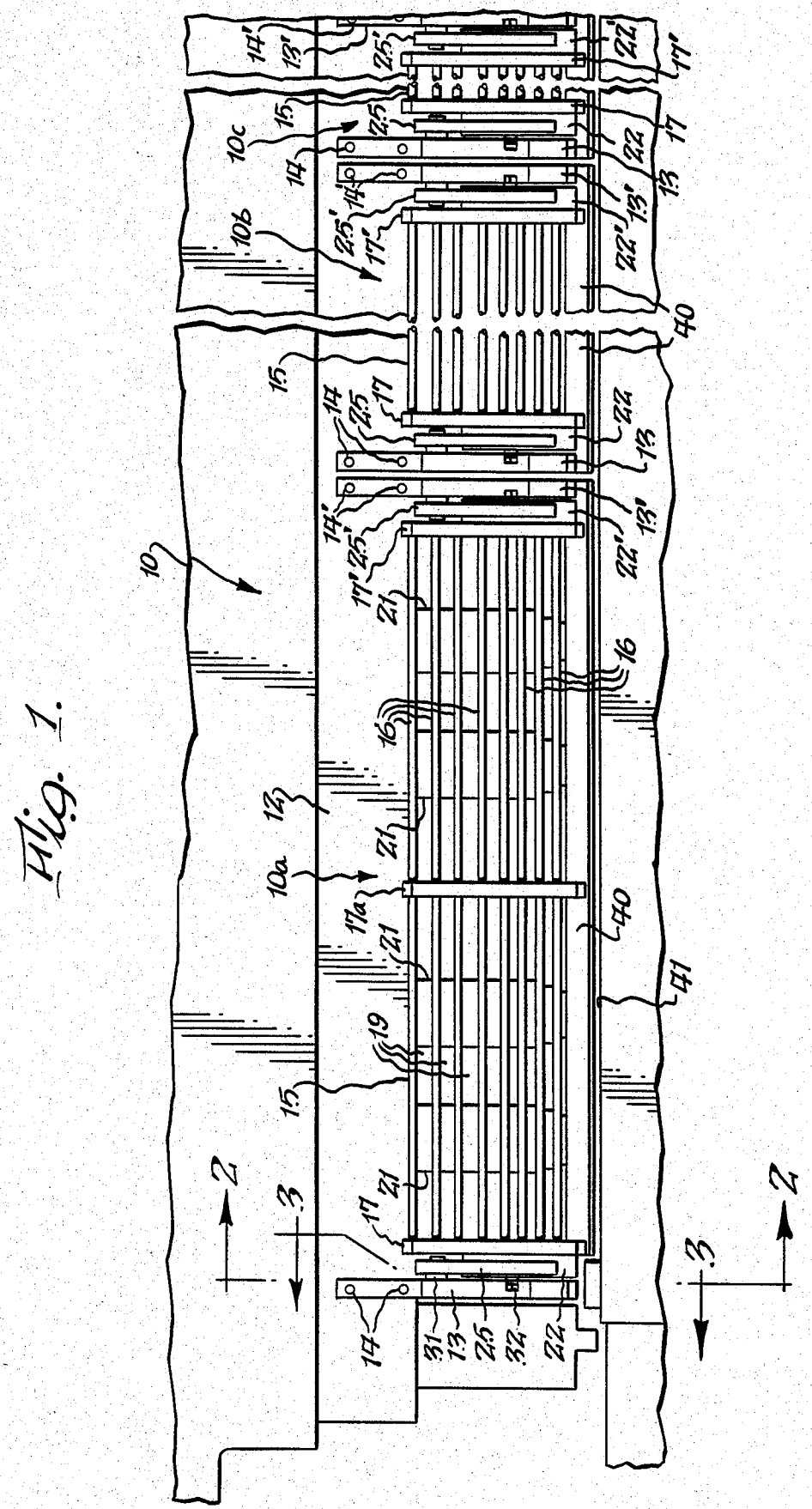
FIG. 1 is a fragmentary front elevational view of the improved barrier guard of the present invention.
Figure 5:
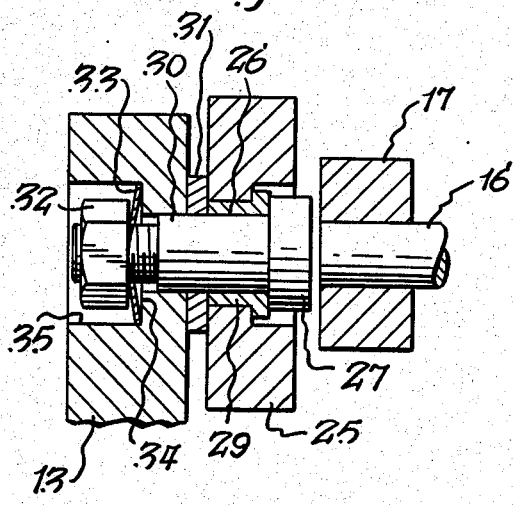
FIG. 5 is a fragmentary cross sectional view taken substantially along line 5—5 of FIG. 4 and showing the pivot mounting for the linkage which supports the barrier guard grille.

The improved barrier guard 10 is shown mounted on a shear 11 and it consists essentially of barrier guard sections 10a, 10b and 10c, each of which is identical to the others. Therefore, only one barrier guard section 10a will be described and like numerals in the other barrier guard sections will depict like elements of structure.

A mounting bar 12 is suitably attached to the shear and brackets 13 and 13' of each barrier guard section are attached thereto by screws 14 and 14', respectively. At this point it is to be noted that the primed numerals represent mirror image counterparts of the structure designated by unprimed numerals.

A grille 15 is mounted between each pair of brackets 13—13'. The configuration of brackets 13 and 13' is shown in FIGS. 2 and 3. Grille 15 consists of a plurality of vertically spaced horizontal rods 16 having their opposite ends mounted on rod holders 17 and 17'. The central portions of rods 16 may be supported by an intermediate rod holder 17a. Spaces 19 are provided between rods 16 so that an operator can look through grille 15 to view the portion of workpiece 20 which is being held down by holddown feet arrangements 21.

Figure 6:
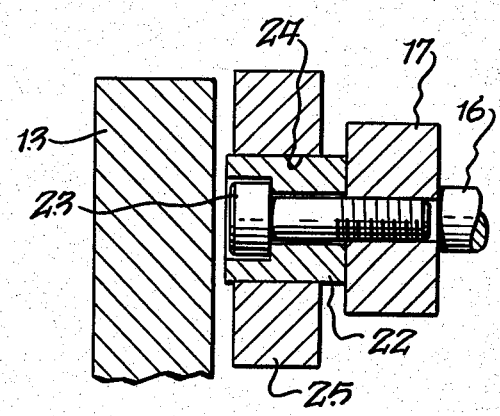
FIG. 6 is a fragmentary cross sectional view taken substantially along line 6—6 of FIG. 4 and showing the connection between the barrier guard grille and the reciprocable member affixed thereto.

Rectangular blocks 22 and 22' are fixedly secured to rod holders 17 and 17', respectively, by means of screws 23 and 23', respectively (FIGS. 4 and 6). Blocks 22 and 22' are slidably mounted in slots 24 and 24', respectively, of links 25 and 25', respectively, which are pivotally secured to brackets 13 and 13', respectively, by pins 26 and 26', respectively. Pin 26 includes a head 27 which bears against bushing 29 in which pin shank 30 is journalled. A spacer-washer 31 separates link 25 from bracket 13, and pin 26 is secured in position by nut 32 which is mounted on the threaded end thereof. A Belville or spring washer 33 is interposed between nut 32 and shoulder 34 of bore 35 in which nut 32 is located. By adjusting nut 32, the force on spring 33 can be set. Pin 26' and its associated structure is the mirror image counterpart of pin 26, and it functions in the same manner. Therefore, a detailed description is not deemed necessary. It can thus be seen that links 25 and 25' are pivotally mounted on brackets 13 and 13', respectively, and that grille 15 is mounted on blocks 22 and 22' for reciprocating movement in slots 24 and 24', respectively.

Figure 7:
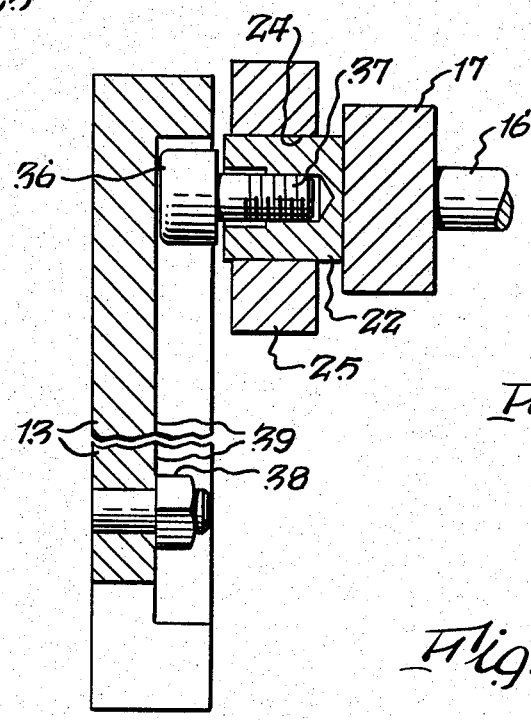
FIG. 7 is a fragmentary cross sectional view taken substantially along line 7—7 of FIG. 4 and showing the slot-follower construction between the barrier guard bracket and the reciprocable sliding member.

In order to control the reciprocating movement of grille 15 in slots 24 and 24', rollers 36 (FIG. 7) and 36' are mounted on the outer ends of screws 37 and 37' which are received in blocks 22 and 22'. Rollers 36 and 36' are received in slots 39 and 39', respectively, of brackets 13 and 13', respectively, so that as links 25 and 25' are caused to pivot about pins 26 and 26', respectively, the grille will also move rectilinearly relative to links 25 and 25' as guided by the movement of rollers 36 and 36' in slots 39 and 39', respectively. Stops 38 and 38' are located at the ends of slots 39 and 39', respectively, and they can be adjusted to vary the lengths of the slots.

Figure 8:
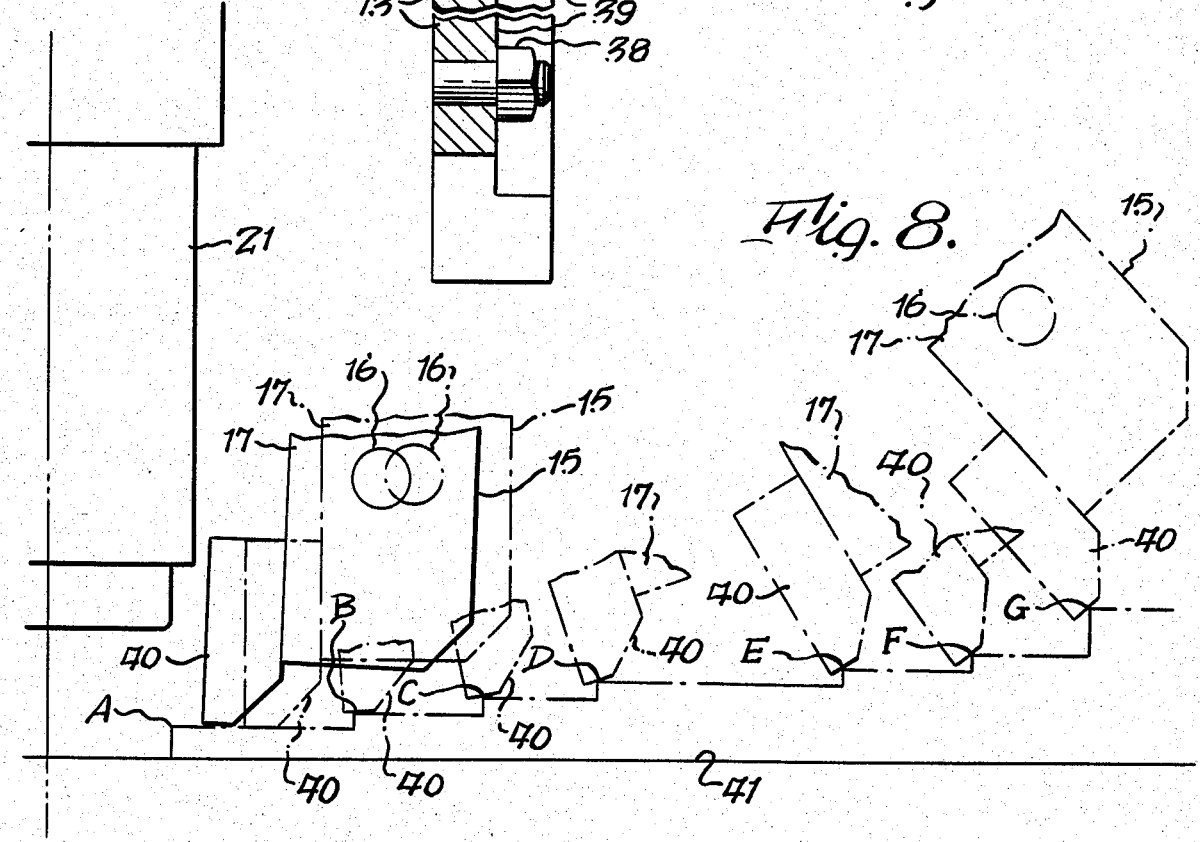
FIG. 8 is a schematic view showing the plurality of positions which can be assumed by the base bar of the grille.

A base bar 40 has its opposite ends fixedly secured to rod holders 17 and 17', respectively. The various positions which base bar 40 can assume are shown in FIG. 8. The path followed by the lowermost portion of base bar 40 is on a compound curve. In other words, as the base bar 40 moves progressively further from plunger 21, it can rise to the illustrated levels A, B, C, D, E, F and G above bed 41 of the shear. Furthermore, the force exerted by spring washers 33 and 33′ will maintain grille 15 in any position in which it has been placed.

It will be appreciated that by changing the location and/or curvature of slots 39 and 39′, the path followed by the lowermost portion of base bar 40 may also be changed, and thus the path followed by base bar 40 need not always be an irregular curve.

While preferred embodiments of the present invention have been disclosed, it will be appreciated that the present invention is not limited thereto but may be otherwise embodied within the scope of the following claims.

What is claimed is:

1. A barrier guard for a machine having a frame and a machine surface comprising barrier means, bracket means, means for immovably mounting said bracket means on said frame, and linkage means for mounting said barrier means on said bracket means, said linkage means comprising link means, pivot means pivotally mounting said link means on said bracket means, reciprocable means, mounting means for mounting said reciprocable means for reciprocation on said link means, means for securing said barrier means to said reciprocable means for movement therewith, follower means interconnecting said reciprocable means and said bracket means to cause said barrier means to follow a path determined by the pivotal movement of said link means and the reciprocating movement of said reciprocable means as governed by movement of said follower means relative to said bracket means, and base means on said barrier means for providing progressively greater clearances from said machine surface during relative movement between said barrier means and said bracket means as said base means moves in a predetermined direction.

2. A barrier guard as set forth in claim 1 including holding means for holding said barrier means in a plurality of different positions.

3. A barrier guard as set forth in claim 2 wherein said holding means comprises a friction connection at said pivot means.

4. A barrier guard as set forth in claim 1 wherein said barrier means comprises a grille.

5. A barrier guard as set forth in claim 4 wherein said grille includes a plurality of rods, and mounting means for mounting said rods on said grille.

6. A barrier guard as set forth in claim 5 wherein said rods comprise a plurality of vertically spaced horizontal rods, and wherein said mounting means comprise spaced rod holders.

7. A barrier guard as set forth in claim 1 wherein said mounting means for mounting said reciprocable means on said link means comprises elongated slot means in said link means.

8. A barrier guard for a machine having a machine surface comprising barrier means, bracket means, and linkage means for mounting said barrier means on said bracket means, said linkage means comprising link means, pivot means pivotally mounting said link means on said bracket means, reciprocable means, mounting means for mounting said reciprocable means on said link means, means for securing said barrier means to said reciprocable means for movement therewith, follower means interconnecting said reciprocable means and said bracket means to cause said barrier means to follow a path determined by the pivotal movement of said link means and the movement of said reciprocable means as governed by said follower means, and base means on said barrier means for providing progressively greater clearances from said machine surface during relative movement between said barrier means and said bracket means as said base means moves in a predetermined direction, said barrier means comprising a grille, said grille including a plurality of rods, mounting means for mounting said rods on said grille, said rods comprising a plurality of vertically spaced horizontal rods, said mounting means comprising spaced rod holders, and said follower means comprising slots in said bracket means and follower members on said mounting means and located in said slots.

9. A barrier guard as set forth in claim 8 wherein said base means comprises a base bar.

10. A barrier guard as set forth in claim 8 including holding means for holding said grille in a plurality of different positions.

11. A barrier guard as set forth in claim 10 wherein said holding means are operatively interposed between said mounting means and said bracket means.

12. A barrier guard as set forth in claim 11 wherein said holding means comprises a friction connection at said pivot means.

13. A barrier guard for a machine having a machine surface comprising barrier means, bracket means, and linkage means for mounting said barrier means on said bracket means, said linkage means comprising link means, pivot means pivotally mounting said link means on said bracket means, reciprocable means, mounting means for mounting said reciprocable means on said link means, means for securing said barrier means to said reciprocable means for movement therewith, follower means interconnecting said reciprocable means and said bracket means to cause said barrier means to follow a path determined by the pivotal movement of said link means and the movement of said reciprocable means as governed by said follower means, and base means on said barrier means for providing progressively greater clearances from said machine surface during relative movement between said barrier means and said bracket means as said base means moves in a predetermined direction, said mounting means for mounting said reciprocable means on said link means comprising elongated slot means in said link means, and said follower means comprising second elongated slot means in said bracket means and follower members on said barrier means and located in said second elongated slot means.

14. A barrier guard as set forth in claim 13 including holding means for holding said barrier means in a plurality of different positions.

15. A barrier guard as set forth in claim 14 wherein said holding means comprises a friction connection at said pivot means.

* * * * *